May 8, 1945.  I. A. MILLER ET AL  2,375,432
VALVE STRUCTURE FOR USE ON WELL CASINGS AND THE LIKE
Filed Nov. 9, 1942  2 Sheets-Sheet 1
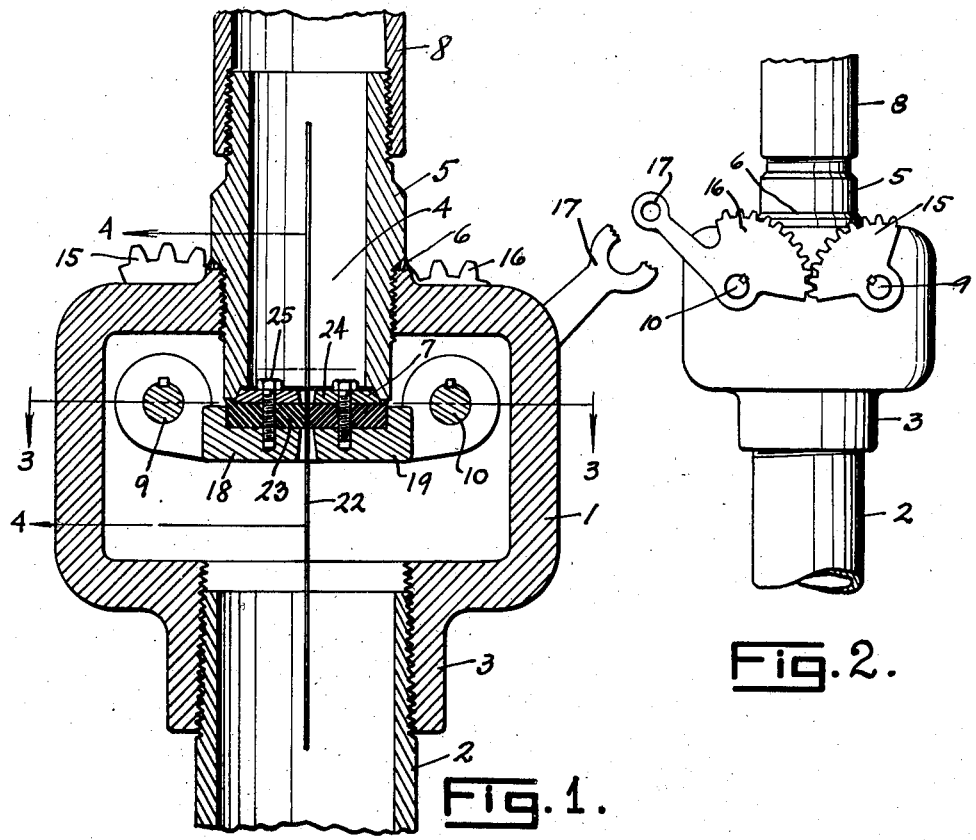
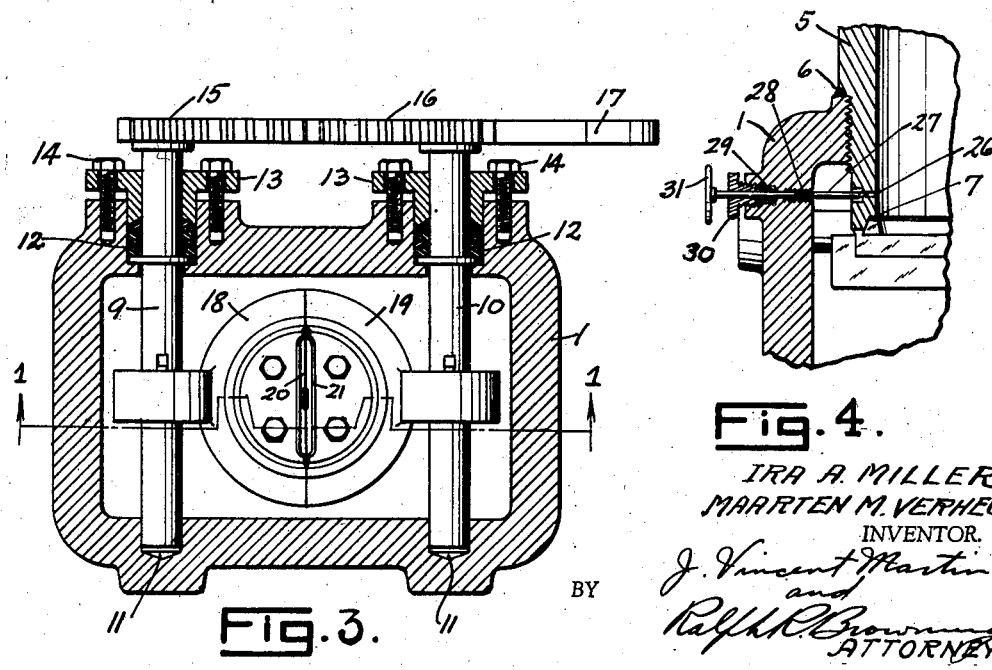
IRA A. MILLER
MAARTEN M. VERHEUL
INVENTOR.

May 8, 1945.   I. A. MILLER ET AL   2,375,432
VALVE STRUCTURE FOR USE ON WELL CASINGS AND THE LIKE
Filed Nov. 9, 1942   2 Sheets-Sheet 2

IRA A. MILLER
MAARTEN M. VERHEUL.
INVENTOR.
ATTORNEY

Patented May 8, 1945

2,375,432

UNITED STATES PATENT OFFICE 2,375,432

VALVE STRUCTURE FOR USE ON WELL CASINGS AND THE LIKE

Ira A. Miller and Maarten M. Verheul, Houston, Tex.

Application November 9, 1942, Serial No. 465,070

3 Claims. (Cl. 277—2)

This invention relates to valve structures and more particularly has reference to a valve construction for closing said casings, and of a type generally referred to as a blow out preventer.

Some valve structures have been developed for closing a well casing about tubing or pipe extending down into the casing and others for closing the entire casing when no pipe or tubing is in place therein and still others have been provided with parts adapted to close about a pipe or tubing and additional parts for completing the closure of the casing when no pipe or tubing is in place therein. These latter structures, however, are not entirely satisfactory because of the double seal required between the main valves and their seat and between the auxiliary valves and the main valves. Furthermore, while positive means for closing and opening the main valves are provided, no such means have been devised for the auxiliary valves. The valves which have been provided for closing the entire casing have, furthermore been such as to prohibit the presence of any tape, wire or the like extending into the casing while the valve is closed.

The principal object of this invention is to provide a casing valve structure which avoids the disadvantages of the prior art structure.

Another and more specific object of this invention is to provide a structure which is capable of closing off the entire passage through a casing, yet which will be capable of completely closing and forming a seal about a thin tape, small wire or the like extending through the casing.

Another object is to provide a structure which will afford the most nearly perfect closure at the lowest possible cost of manufacture and with the least use of critical war materials.

Another object is to provide such a structure which will be devoid of small external parts which might be broken off to permit a blow out.

Another object of this invention is to provide a casing valve structure having valve means for closing the casing about a pipe extending through the same, and valve means for completely closing the casing when the pipe is removed, each valve means being positively controlled.

A further object of this invention is to provide a casing valve having a housing with an opening in the top thereof, a tube in said opening and extending down into said housing and having a valve seat provided at its lower end, valve means in the casing for engaging said seat to close the opening about a pipe in said casing and other valve means for engaging the seat to close the opening when the pipe is removed from the casing.

Still another object of this invention is to provide a casing valve structure having valve means for closing the casing about a pipe extending through the same, and valve means for completely closing the casing when the pipe is removed, each valve means being positively controlled and adapted to engage a common seat.

A still further object of this invention is to provide a valve structure for a well casing which comprises a housing mounted on the casing and having an opening in the top thereof, a tube in said opening and extending down into said housing and having a valve seat provided at its lower end, valve means in the casing for engaging said seat to close the opening, said tube having an aperture therein and means operable from the exterior of said housing to open and close said aperture.

With these and other objects in view as will appear more fully hereinafter, the present invention is embodied in the parts and combinations described in the specification and shown in the drawings.

In the drawings:

Figure 1 is a vertical sectional view of a casing valve embodying certain features of the present invention.

Fig. 2 is an elevational view of the valve of Fig. 1.

Fig. 3 is a sectional view taken on line 3—3 of Fig. 1.

Fig. 4 is an enlarged fragmentary sectional view taken on line 4—4 of Fig. 1.

Figure 5:
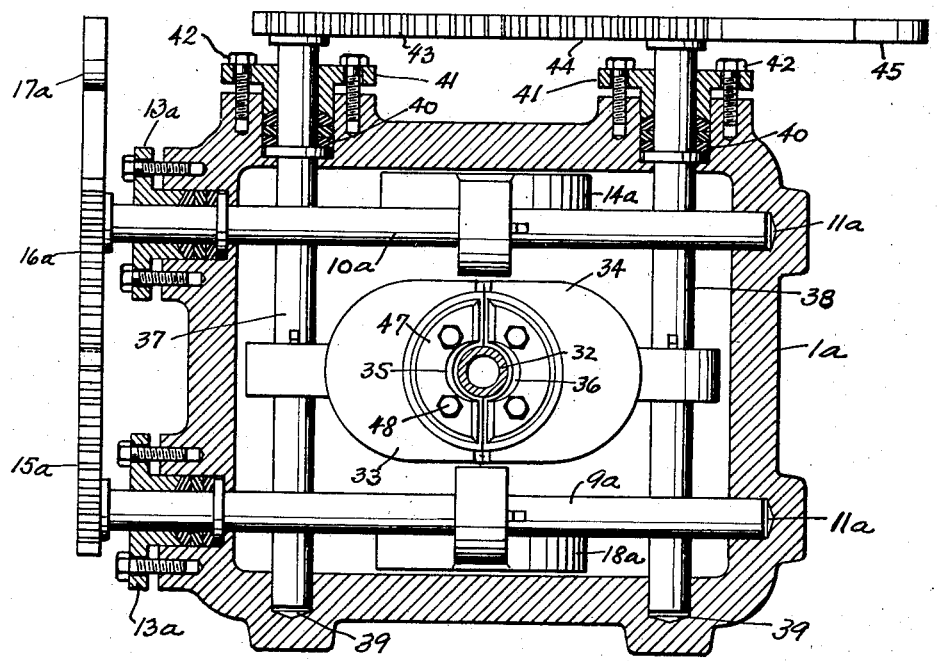
Fig. 5 is a sectional view similar to Fig. 3 illustrating a modification of the present invention and taken on line 5—5 of Fig. 6.

As shown in the drawings the casing valve of the present invention comprises a housing 1 mounted on the upper end of the well casing 2. For this purpose housing 1 is provided with a threaded boss 3 which receives the upper threaded end of the casing. The top of the housing 1 is provided with a threaded opening 4 in which is mounted a threaded tube 5. This tube after being mounted in housing 1 may be welded in place to avoid accidental removal as indicated by reference character 6.

At its lower end tube 5 is formed to provide a seat 7 for valves in the housing. For this purpose the end of the tube is cut away on its inner portion as shown in Figs. 1 and 4. The upper end of tube 5 is secured to a conduit 8.

Extending horizontally of the housing 1 on each side of the tube 5 are parallel shafts 9 and 10. One end of each of these shafts is journalled in sockets 11 provided in one wall of housing 1 and the other ends of said shafts project through openings 12 in the opposite wall of housing 1. The outer portions of openings 12 are of enlarged diameter to provide for the reception of packing material which is compressed about the shafts 9 and 10 by rams 13 to seal the shafts in said openings 12. Rams 13 are forced into the opening 12 by screws 14 as shown in Fig. 3.

Shafts 9 and 10 are interconnected for simultaneous rocking movement by means of meshing toothed segments 15 and 16 which are keyed on the outer ends of said shafts. Power for actuating the shafts may be transmitted thereto through the crank arm 17 which may be integral with toothed segment 16.

Within the housing 1 the shafts 9 and 10 carry valve gates 18 and 19 respectively which are keyed or otherwise fixed to said shafts.

As shown in Figs. 1 and 3 of the drawings, the gates 18 and 19 are of general semi-circular configuration and are provided with cut-out portions 20 and 21 which register with each other and cooperate to provide an opening between the gates when closed for the passage of a tape or cable 22 which is suspended down into the casing 2.

Each of the gates 18 and 19 has formed on its upper surface a semi-circular cup-shaped recess in which semi-circular discs or rings of packing material 23 are placed. Positioned on the upper surface of the packing material 23 are semi-circular discs or rings 24 of metal or other rigid material which are held in place by screws 25 which pass loosely through the same. The screws 25, however, are threaded into recesses in the upper surfaces of the gates 18 and 19. This construction permits the plates 24 which act as means for compressing the packing 23 to move relatively to the gates per se.

When the gates 18 and 19 constructed as above described and illustrated in Fig. 1 are moved into engagement with the seat formed in the lower end of tube 5, the plates 24 engage said seat and further movement of the gates due to applied force on the shafts 9 and 10 or to pressure from the casing 2 will force the gates toward the seat on the lower end of tube 5. This action will cause the plates 24 to be displaced toward the respective gates 18 and 19 and will serve to compress the packing 23 and cause the same to expand in a transverse direction. Due to the transverse expansion of the packing 23, it will serve to provide a closer seal against the lower end of the seat around the outside edges of the discs or rings. The greater the pressure the more will be the tendency for these packing members to be forced into sealing engagement with each other and with the lower end of the seat.

It will be noted that in addition to the cut-out portions 20 and 21 in the gates 18 and 19 that the plates 24 mounted on said gates are similarly cut out to provide for the passage of the cable or tape 22 through the same. The packing material 23, however, is not so cut out because when the gates are closed about the cable 22 the packing material will be compressed about the cable and while permitting the gates to be closed about the cable will provide a leakproof seal about said cable.

If when it is desired to open the valve gates 18 and 19 there is a considerable pressure exerted on the under surface thereof, it will be necessary to equalize this pressure at least in part on both sides of the valve gates before they can be opened. For this purpose the present invention provides a novel by-pass to provide communication between the interior of the housing 1 for the valve gates and the interior of the tube 5. In this connection the tube 5 is provided with an aperture 26 into which is adapted to be inserted the pointed or otherwise shaped end of a valve stem 27. In order to displace the valve stem 27 to cause the valve body formed on the end thereof to seat and unseat in the aperture 26, said stem 27 is threaded as indicated by reference character 28 and is mounted in a threaded bore formed in the wall of the housing 1. The portion of the threaded bore adjacent the outer surface of the wall of the housing 1 is enlarged to receive packing material 29 which is compressed by a threaded plunger 30 surrounding the stem 27 and threadedly mounted in the outer threaded portion of the bore in the wall of housing 1. The outer end of the stem 27 carries an operating knob 31 by means of which the stem may be rotated to effect seating and unseating of the inner end thereof relative to the bore 26.

The above described by-pass, while being effective to equalize the pressure on both sides of the valve gates, nevertheless presents only a very small portion on the exterior of the housing and consequently is not subject to the disadvantages of a construction in which a by-pass tube connects the housing 1 with the tube 5 on the exterior thereof. The compact arrangement of the present invention is therefore not liable to be accidently broken so as to permit the free flow of fluid under pressure from the housing 1. The most that could happen to the construction herein described is that the knob 31 could be broken from the stem 27. However, this would not open the aperture 26 to permit the free flow of fluid under pressure through the same.

Figure 6:
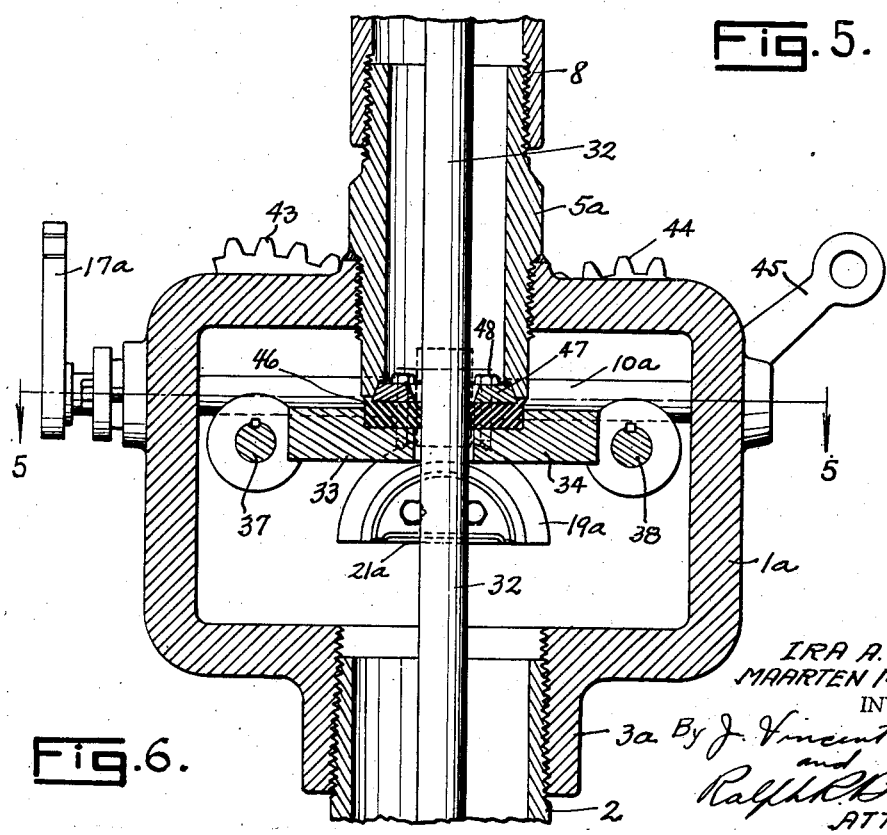
Fig. 6 is a vertical sectional view of the modified form of valve shown in Fig. 5.

In Figs. 5 and 6 of the drawings there is shown a form of the present invention in which two sets of gates are mounted in the housing 1a. One set of gates 18a and 19a is identical to those illustrated in Figs. 1–3 of the drawings and these gates are adapted to be seated on the lower end of the tube 5a when the other set of gates are open and when nothing more than a cable or tape passes down through the casing. However, when it is desired to close the lower end of the tube 5a while a drill pipe 32 or other conduit of large diameter is passing therethrough, the gates 18a and 19a are opened and the second set of gates which are constructed to close about the conduit 32 are seated against the lower end of the tube 5a.

This second pair of gates 33 and 34 are constructed siimlarly to gates 18 and 19 of Figs. 1–3 and differ therefrom primarily in the size and shape of the recesses 35 and 36 formed in the meeting edges of said gates. These recesses are large enough to enable the gates to close about the pipe or conduit 32.

Gates 33 and 34 are carried by a pair of parallel shafts 37 and 38 respectively to which they are keyed. Each of the shafts 37 and 38 has one end journalled in a socket 39 formed in one wall of the housing 1a and its other end projecting through an opening in the opposite wall of the housing. The outer portions of these openings are enlarged for the reception of packing material 40 to seal the shafts in the openings. Plungers 41 actuated by screws 42 are provided to compress the packing material.

Shafts 37 and 38 are connected by toothed segments 43 and 44 respectively, the latter segment having an actuating arm 45 extending therefrom.

On the upper surfaces of each of gates 33 and 34 there is formed a cup-shaped recess of semi-circular configuration and in which are semi-circular discs or rings of packing material 46. Plates 47 of metal or other rigid material similar to the plates 24 are positioned on top of the packing discs and slidably mounted on screws 48 which are threaded into sockets in the upper surfaces of the gates. This construction enables the packing to be compressed and laterally expanded when the gates are seated in the manner described in connection with gates 18 and 19 of Figs. 1–3. In the case of gates 33 and 34, however, the packing conforms to the recesses 35 and 36 projecting beyond the same only sufficiently to effectively seal the gates about the pipe 32 when the gates are closed.

The by-pass illustrated in Fig. 4 is of course applied to the structure of Figs. 5 and 6.

In constructing the device as illustrated in Figs. 5 and 6 with two positively and independently operated pairs of gates both of which engage and seal against the same removable and replaceable seat, effective control of the flow from the casing 2 is obtained whether a pipe or conduit is extending down into the same or whether it is vacant or merely has a thin tape or cable extending down into the same. The structure is compact, efficient and the parts subject to wear can be readily and easily replaced.

Having described our invention, we claim:

1. A casing valve comprising a housing for mounting on a well casing, said housing having an opening in its top aligned with the casing, a pair of cooperating gates mounted on pivoted shafts extending horizontally of the housing, a gate seat surrounding the opening in the top of the housing, said seat including a flat end face portion, said gates having packed receiving recesses in the surfaces thereof which are to cooperate with the seat, packing in said packing receiving recesses and substantially confined thereby against flow in a radially outward direction, and packing compressing plates mounted on said packing for engaging the seat and causing the packing to flow axially into sealing engagement with said flat end face portion to provide a seal between the gates and the seat.

2. A casing valve comprising a housing for mounting on a well casing, said housing having an opening in its top aligned with the casing, a pair of cooperating gates mounted on pivoted shafts extending horizontally of the housing, a gate seat including a flat end face portion surrounding the opening in the top of the housing, said gates being of a size such that portions of their adjacent edges meet when the gates are closed against said seat, said gates having small recesses in their meeting edges to provide a small opening therethrough when closed and packing receiving recesses in the surfaces thereof which are to cooperate with said seat, packing in said packing receiving recesses and substantially confined thereby against flow in a radially outward direction, and packing compressing plates mounted on said packing for engaging the seat and causing the packing to flow axially into sealing engagement with said flat end face portion to provide a seal between the gates and the seat.

3. A casing valve comprising a housing for mounting on a well casing, said housing having an opening in its top aligned with the casing, a pair of cooperating gates mounted on shafts extending horizontally of the housing, a gate seat surrounding the opening in the top of the housing, packings of a nature adapted to flow under pressure mounted on each of said gates, means on said gates confining said packing against flow in any direction other than toward said seat and toward each other when the gates are in closed position, and packing compressing plates mounted on said packings respectively and positioned to engage portions of said seat as said gates are closed so that forces tending to urge said gates against said seat will cause compression of said packings and flow thereof toward said seat to provide a seal between the gates and the seat.

IRA A. MILLER.
MAARTEN M. VERHEUL.